US007590286B2

(12) United States Patent
Miyamori

(10) Patent No.: US 7,590,286 B2
(45) Date of Patent: Sep. 15, 2009

(54) IMAGE RECOGNITION APPARATUS AND PROGRAM FOR RECOGNIZING THE SUBSTANCE OF AN IMAGE, PARTICULARLY IN A MOTION PICTURE ENVIRONMENT

(75) Inventor: Hisashi Miyamori, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 556 days.

(21) Appl. No.: 10/522,236

(22) PCT Filed: Jul. 26, 2002

(86) PCT No.: PCT/JP02/07649

§ 371 (c)(1),
(2), (4) Date: Jan. 25, 2005

(87) PCT Pub. No.: WO2004/012150

PCT Pub. Date: Feb. 5, 2004

(65) Prior Publication Data

US 2005/0213817 A1  Sep. 29, 2005

(51) Int. Cl.
*G06K 9/46* (2006.01)
*G06K 9/34* (2006.01)
*H04N 5/225* (2006.01)

(52) U.S. Cl. .................. 382/190; 348/169; 382/176
(58) Field of Classification Search ................ 382/190
See application file for complete search history.

(56) References Cited

U.S. PATENT DOCUMENTS

| 5,923,365 | A | * | 7/1999 | Tamir et al. ............ 348/169 |
| 6,031,568 | A | * | 2/2000 | Wakitani ................. 348/169 |
| 6,071,002 | A | * | 6/2000 | Katayama ............... 434/257 |
| 6,072,504 | A | * | 6/2000 | Segen ...................... 345/474 |
| 6,101,274 | A | * | 8/2000 | Pizano et al. ............ 382/176 |
| 6,231,443 | B1 | * | 5/2001 | Asai et al. ................. 463/32 |
| 2002/0018594 | A1 | * | 2/2002 | Xu et al. .................. 382/190 |
| 2002/0159637 | A1 | * | 10/2002 | Echigo et al. ............ 382/190 |

FOREIGN PATENT DOCUMENTS

| JP | 9-313660 | 12/1997 |
| JP | 2002-135804 | 5/2002 |

OTHER PUBLICATIONS

Pingali et al., Ball Tracking and Virtual Replays for Innovative Tennis Broadcasts, 15th International Conference on Pattern Recognition, 2000, Proceedings, vol. 4, pp. 152-156.*

(Continued)

*Primary Examiner*—Bhavesh M Mehta
*Assistant Examiner*—David P Rashid
(74) *Attorney, Agent, or Firm*—Westerman, Hattori, Daniels & Adrian, LLP.

(57) ABSTRACT

A relatively inexpensive image recognition apparatus offering a high image recognition rate. An image recognition apparatus recognizes movements of players matched against each other between domains partitioned with obstacles from content including a television program being telecasted to show the sport match or game, image material in an uncompleted state for broadcasting and content recorded in such a recording medium as a VTR, the image recognition apparatus including: a score information obtaining section; a play event information obtaining section obtaining movements of players from picture information, the picture information containing images of obstacles and players, the score information displayed on a screen; and an image substance recognizing section making a comparison between score information item obtained immediately before a time in the play event information and a score information item obtained immediately after a time, thereby recognizing a substance of an image provided by the play event information.

9 Claims, 9 Drawing Sheets

OTHER PUBLICATIONS

Sudhir et al., Automatic Classification of Tennis Video for High-level Content-based Retrieval, Proceedings of the 1998 International Workshop on Content-Based Access of Image and Video Databases (CAIVD '98), 1998, pp. 81-90.*

Saur et al., Automated Analysis and Annotation of Basketball Video, Store and Retrieval for Image and Video Databases V, SPIE vol. 3022, pp. 176-187, 1997.*

Sudhir et al., Automatic Classification of Tennis Video for High-Level Content-Based Retrieval, Proc. Of IEEE Workshop on Content-Based Access of Image and Video Databases, CAIVD'98, 1998.*

Gong et al., Automatic Parsing of TV Soccer Programs, Proc. Int'l Conf. On Multimedia Computing and Systems, pp. 167-168, 1997.*

Hisashi Miyamori, Information Processing Society of Japan Kenkyu Hokoku, vol. 2002, No. 26, pp. 89-94, Mar. 8, 2002, Cited in the int'l. search report.

* cited by examiner

FIG. 9

| BASIC MOVEMENT INFORMATION ID | BASIC MOVEMENT INFORMATION |
|---|---|
| K0001 | stay |
| K0002 | move |
| K0003 | forehand-swing |
| K0004 | backhand-swing |
| K0005 | overhead-swing |

FIG. 10

| MOVEMENT INDEX | MOVEMENT INDEX RULE INFORMATION |
|---|---|
| SERVICE | BOTH PLAYERS DO "STAY" IN RESPECTIVE ZONES OUTSIDE THE COURT AT THE SAME POINT IN TIME AND THEN EITHER OF THE PLAYERS DOES "OVERHEAD_SWING" IN THE ZONE OUTSIDE THE COURT. |
| DASH TO THE NET | A PLAYER HITTING THE BALL IS IN A ZONE OTHER THAN THE NET COURT AT THE TIME OF HITTING AND THEN THE PLAYER IS IN THE NET COURT AT THE TIME OF NEXT HITTING. |
| ⋮ | ⋮ |

006
IMAGE RECOGNITION APPARATUS AND PROGRAM FOR RECOGNIZING THE SUBSTANCE OF AN IMAGE, PARTICULARLY IN A MOTION PICTURE ENVIRONMENT

TECHNICAL FIELD

The present invention relates to an image recognition apparatus capable of advantageously recognizing even the substance of an image included in sports-related contents such as a image material in an uncompleted state for broadcasting and a sports program being telecasted or as recorded in a recording medium, the substance of such an image having been conventionally difficult to recognize.

BACKGROUND ART

Among conventional methods of recognizing the substance of an image, such as "successful passing shot" and "successful smash", contained in a scene of a sports picture of, for example, tennis, there are known methods of recognizing the substance of such an image by manually inputting a "successful passing shot" section, a "successful smash" section and a like section of picture information one by one, or by extracting positions of respective of a ball, players and court lines and totally judging a change with time in spatial correlations among the extracted positions with use of a computer.

The method of image recognition based on manual input, however, involves a problem of increased labor costs and a problem of heavy burden on the operators which arises when the contents processing takes a long time, though the substance of an image can be reliably recognized. On the other hand, the method of automatic image recognition with a computer has a difficulty in judging whether the ball is on line or out particularly when the ball falls to the ground adjacent a line.

DISCLOSURE OF INVENTION

In order to solve the foregoing problems the present invention provides the following means.

That is, the present invention provides an image recognition apparatus for recognizing movements of players matched against each other between domains partitioned with such an obstacle as net in a sport match or game from contents including a television program being telecasted to show the sport match or game, an image material in an uncompleted state for broadcasting and contents recorded in such a recording medium as a VTR, the image recognition apparatus comprising: a score information obtaining section configured to obtain score information indicative of scores of the respective players which vary as the sport match or game proceeds; a play event information obtaining section configured to obtain play event information indicative of a characteristic movement of each of the players from picture information included in the contents, the picture information containing images of respective of the obstacle and the players, the score information displayed on a screen, and like images; and an image substance recognizing section configured to make a comparison between a score information item obtained immediately before a point in time of generation of the play event information and a score information item obtained immediately after the point in time and make reference to a result brought by the play event information, thereby recognizing a substance of an image provided by the play event information.

This image recognition apparatus is capable of recognizing a specific image substance by exactly grasping the description of the play event information since the apparatus can reliably judge which of the players' respective scores relates to a play event information item from score information items obtained immediately before and after the point in time of the generation of the play event information item.

In a specific embodiment of the present invention for extracting the score information from the contents, the score information obtaining section is configured to obtain the score information from at least one of the picture information included in the contents, sound information including commentary voice of a commentator, and data information transmitted as multiplexed on radio waves during broadcasting.

To extract the characteristic movement of each player from the contents, it is preferable that the image recognition apparatus further comprises: a domain element extracting section configured to extract from the picture information facility information including information on the obstacle, information on the domains and information on boundary lines between the domains and an area outside the domains, player's position information indicative of a player's position, and instrument information on an instrument moving between the domains to serve as an object of score count in the sport match or game; rule information storage section configured to store rule information on the sport match or game; and basic movement storage section configured to store basic movement information on players' characteristic movements generalized in a sport of concern, wherein the play event information obtaining section includes a play event information determining section configured to determine a play event information item on a play event characteristic of each of the players included in the picture information as the play event information based on domain elements extracted from the picture information, the rule information, and the basic movement information stored in the basic movement information storage section.

To extract players' characteristic movements more efficiently, it is desirable that the player's position information be position information indicative of a domain containing each of the players and the instrument constantly held and used by the player.

In a specific embodiment of the present invention for extracting the player's position information from the picture information, the domain element extracting section is configured to extract the player's position information from the picture information based on the facility information extracted by the domain element extracting section. In a specific embodiment of the present invention for extracting the instrument information from the picture information, the domain element extracting section is configured to extract the instrument information including information on a ball from the picture information based on the facility information and the player's position information extracted by the domain element extracting section.

For the image recognition apparatus to be capable of recognizing images including an image of a more complicated movement of each player, it is desirable that the play event information obtaining section include a play event index information output section configured to output plural play event information items determined by the play event information determining section as arranged in a time sequence. It is more desirable that the play event index information output section be configured to output the play event information items together with instrument information items as arranged in a time sequence.

To extract a contents element related to a sport of concern suitably, it is desirable that the facility information, the player's position information, the instrument information and the rule information be based on knowledge about a sport as a subject for image extraction.

BRIEF DESCRIPTION OF DRAWINGS

FIG. 9 is an illustration of a manner of storage by a basic movement information storage section of the embodiment.

FIG. 10 is an illustration of a manner of storage by a rule information storage section of the embodiment.

BEST MODE FOR CARRYING OUT THE INVENTION

Hereinafter, one embodiment of the present invention will be described with reference to the drawings.

Figure 1:
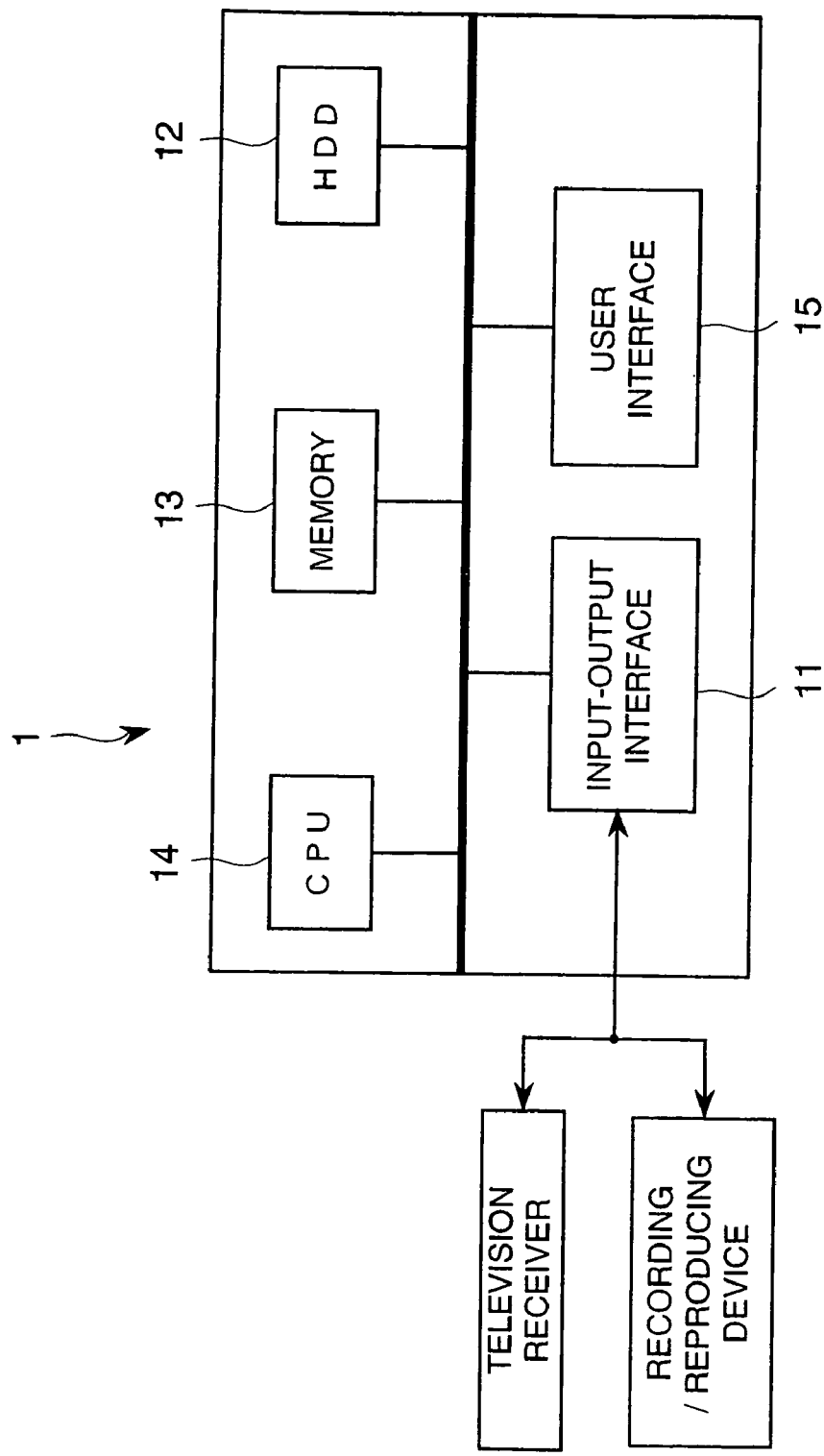
FIG. 1 is a diagram showing the device configuration of an image recognition apparatus according to an embodiment of the present invention.
Figure 2:
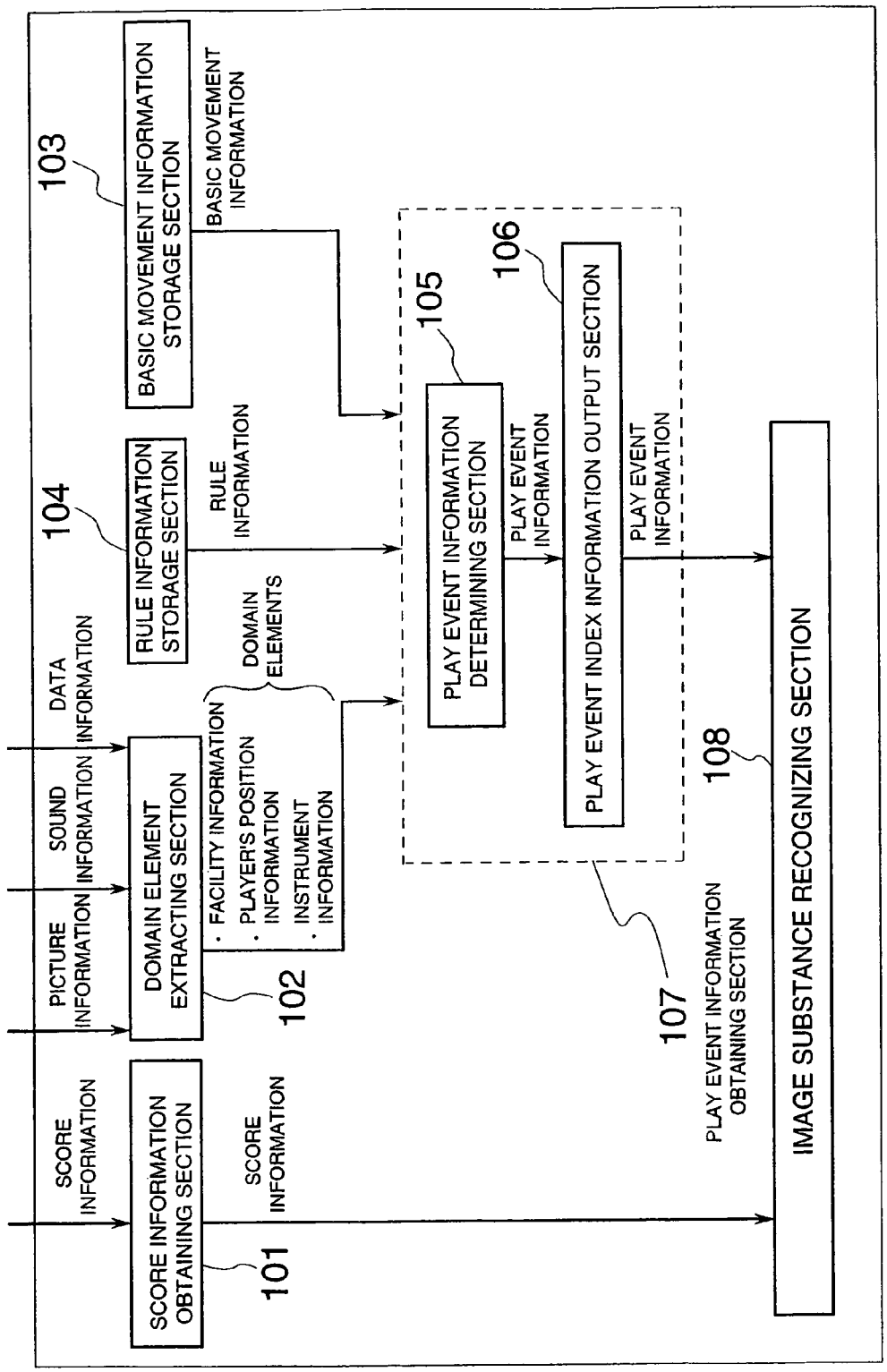
FIG. 2 is a function block diagram of the embodiment.

FIG. 1 is a diagram showing the device configuration of an image recognition apparatus according to an embodiment of the present invention. FIG. 2 is a function block diagram of the embodiment.

The image recognition apparatus according to this embodiment is configured to recognize characteristic movements of players in a sport match or game from sports contents including a television program being telecasted on a television receiver TV or being reproduced by a recording/reproducing device such as a VTR, and such contents as recorded in a recording medium. As shown in FIG. 1, the image recognition apparatus includes, as major components thereof, an input-output interface 11 connected to the television receiver TV and the recording/reproducing device such as a VTR, an external storage device 12 and internal memory 13, such as HDD or the like, for storing data, programs and the like, a CPU 14 configured to operate according to a program stored in the external storage device 12 or the like to cause the apparatus to function as image recognition apparatus 1, a user interface 15 comprising a keyboard and a mouse for receiving user information about the user, and a like component. The "contents", as used herein, is meant to include pictures including images of movements of players, a shot taken at such an angle to view a court from obliquely above along the length of the court and a close-up shot of a judge or a spectator, and sound including voice of a commentator and the like. In this embodiment, reference is made to a tennis program as an example of the "contents".

In a functional aspect, the image recognition apparatus 1 has functions as a score information obtaining section 101, a domain element extracting section 102, a basic movement information storage section 103, a rule information storage section 104, a play event information obtaining section 107 comprising a play event information determining section 105 and a play event index information output section 106, an image substance recognizing section 108, and a like section, as shown in FIG. 2, which functions are fulfilled by the operations of the CPU 14 and the like.

These sections will be described in detail.

The score information obtaining section 101 is configured to automatically obtain score information on scores of respective players being matched against each other which vary as the match proceeds by image analysis on picture information displayed on a television receiver. The score information obtaining section 101 is formed by utilizing the input-output interface 11 and the like. While the score information obtaining section 101 is configured to obtain the score information automatically in this embodiment, the score information may be obtained in any desired manner, for example, by manual input.

The domain element extracting section 102 is configured to extract from the picture information facility information including information on such an obstacle as net, information on a court as partitioned domains, and information on court lines as boundary lines between the domains and an area outside the domains, player's position information indicative of the position of each player, and instrument information on an instrument moving between half-courts to serve as an object of score count in the sport match. In this embodiment, the facility information to be extracted comprises information on the court lines and information on the net lines; the player's position information to be extracted comprises position information on each of players 1 and 2 matched against each other; and the instrument information to be extracted comprises information on a tennis ball (hereinafter will be referred to as "ball"). The facility information, player's position information and instrument information extracted by the domain element extracting section will be generally referred to as domain elements.

Figure 3:
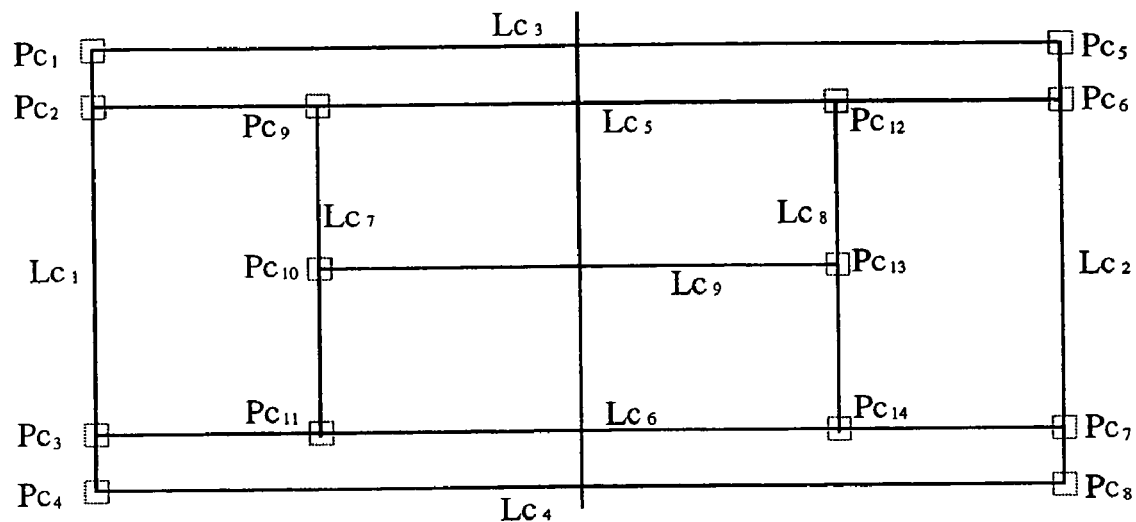
FIG. 3 is a diagram illustrating a court model for use in extracting court lines from picture information according to the embodiment.
Figure 4:
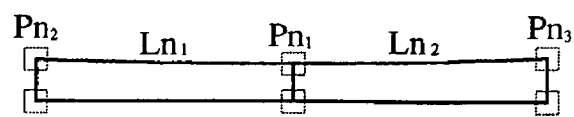
FIG. 4 is a diagram illustrating a net model for use in extracting net lines from picture information according to the embodiment.

More specifically, in extracting the facility information, information on the court lines and information on the net lines are extracted in this order from the picture information by reference to a court model specifying court characteristic points $Pc_1, \ldots, Pc_{14}$ (hereinafter will be generally referred to as "Pc") as representative points on the court lines and court lines $Lc_1, \ldots, Lc_9$ (hereinafter will be generally referred to as "Lc") as shown in FIG. 3 and a net model specifying net characteristic points $Pn_1, \ldots, Pn_3$ (hereinafter will be generally referred to as "Pn") as representative points on the net lines and net lines $Ln_1$ and $Ln_2$ (hereinafter will be generally referred to as "Ln") as shown in FIG. 4.

First, the court lines are extracted from the picture information by detecting the court characteristic points. More specifically, at a point in time t=0, initial characteristic points Pc(0) are given as inputs; court lines Lc(0) determined by the characteristic points Pc(0) are transformed into a Hough plane; and then a detection window Wc(0) having dimensions $W_{th}$ and $W_{ro}$ is provided about each peak point on the Hough plane. At a point in time t=t, first, a binary image B(t) of an original image and an area around court lines Lc(t−1) are ANDed to generate a binary image Bc(t) comprising only the area around the court (hereinafter will be referred to as "court line binary image"). Subsequently, the process steps of: subjecting this binary image to Hough transformation line by line; performing peak detection within the range limited by each detection window Wc(t−1); updating the court characteristic points Pc(t); subjecting court lines Lc(t) to Hough transformation again; and updating detection windows Wc(t), are performed to extract the court lines from the picture image. If a certain court characteristic point is positioned out of the screen due to panning or the like, update is achieved by estimating the position of the point outside the screen based on connecting knowledge on the assumption that a court characteristic point $Pc_i(t)$ (i=9, 10, 12, 13, or 10, 11, 13, 14) indicating the center of the court is constantly displayed on the screen. For the same reason, some of initial characteristic points may be omitted. The "connecting knowledge" is knowledge defined based on such knowledge used in doing a sport of concern that connecting court characteristic points $Pc_i(t)$ (i=9, 10, 12, 13) for example with each other on a central area of the court allows a zone that can have a meaning to be defined on the court model.

Subsequently, the net lines are extracted from the picture information by the following process steps: at a point in time t=0, initial characteristic points Pn(0) are given as inputs; a net line Ln(0) and a detection window Wn(0) are provided for each line in the same manner as with the court lines; at a point in time t=t, an image Bn(t)=B(t)−Bc(t), which is a binary image formed by removing the court line binary image from the binary image of the original image, is generated as a net line binary image; this binary image is subjected to Hough transformation; peak detection is performed within each detection window; and the characteristic points Pn(t) are updated.

Figure 5:
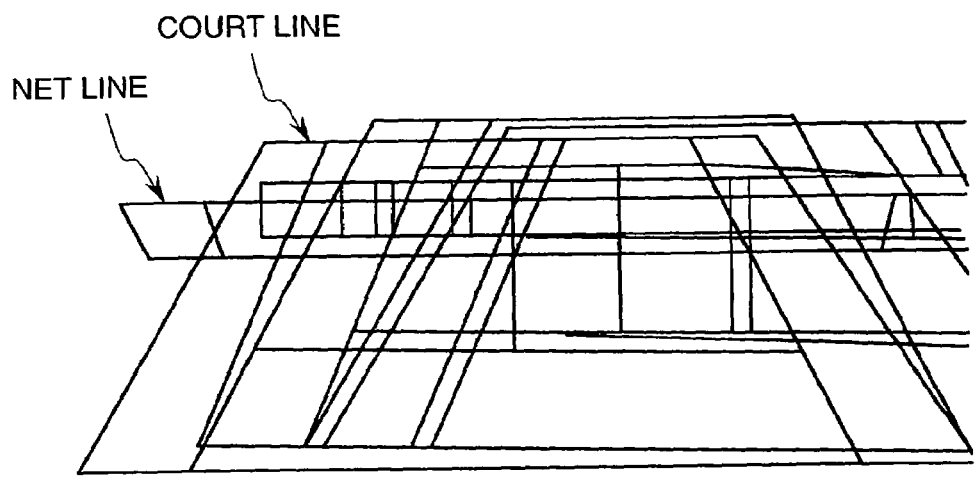
FIG. 5 is a diagram illustrating the court lines and net lines extracted from picture information according to the embodiment.

In this way the court lines and the net lines can be extracted as shown in FIG. 5.

In turn, the player's position information is extracted by specifying a domain in which overlapping is maximum in binary images formed by removing the court lines and the net lines from the picture image.

Figure 6:
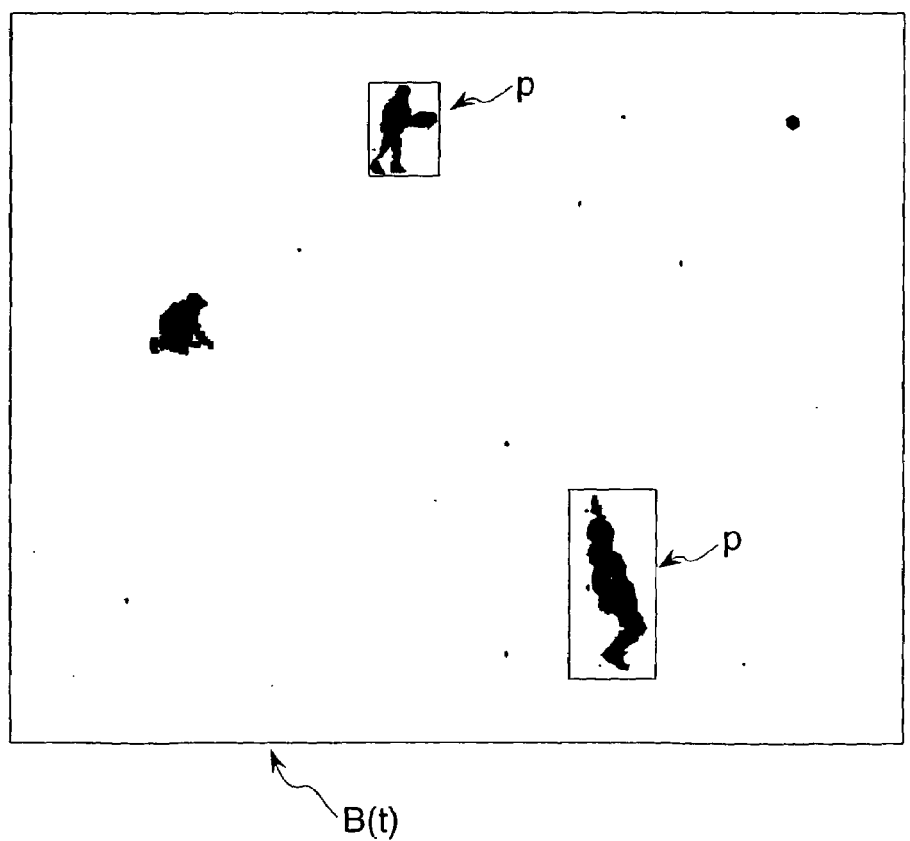
FIG. 6 is an illustration of a player's domain detected according to the embodiment.

More specifically, at a point in time t=t, differences from images that are forwardly and backwardly apart from an image of concern by s frames are found to generate binary images $B_1(t)$ and $B_2(t)$ using appropriate threshold values. Here, $B_1(t)$=BIN(I(t)−I(t−s)), and $B_2(t)$=BIN(I(t+s)−I(t)), wherein BIN is a function making the parenthesized factor binary. Based on a binary image $B_{diff}(t)$ resulting from an AND operation on these two difference images and a binary image $B_{label}(t)$ in which those points on an image I(t) at a point in time t=t which are included in a color cluster corresponding to a predetermined representative color of, for example, a players' uniform are each defined as 1, the court lines and the net lines are erased. Further, a domain from which a portion overlapping the player's domain is considered to have been removed is compensated through expansion/compression processing. The two images thus obtained are ORed to give a binary image B(t) as shown in FIG. 6. A connected domain within the binary image B(t) thus obtained is labeled and the thus labeled domain is observed throughout several frames to avoid influence of noise. Such a domain in the area covering the court and the area therearound is determined as a player's initial position if the domain has an area larger than a predetermined value. Of such domains each having an area larger than the predetermined value at the point in time t=t, those domains each of which is located adjacent a player's domain at a point in time t=t−1 and has the smallest difference in area from the latter player's domain is judged as a player's domain p, thereby providing player's position information.

By switching between a detection mode and a trace mode in accordance with the distance from the player's position given by the player's position information thus extracted, the ball is extracted.

Figure 7:
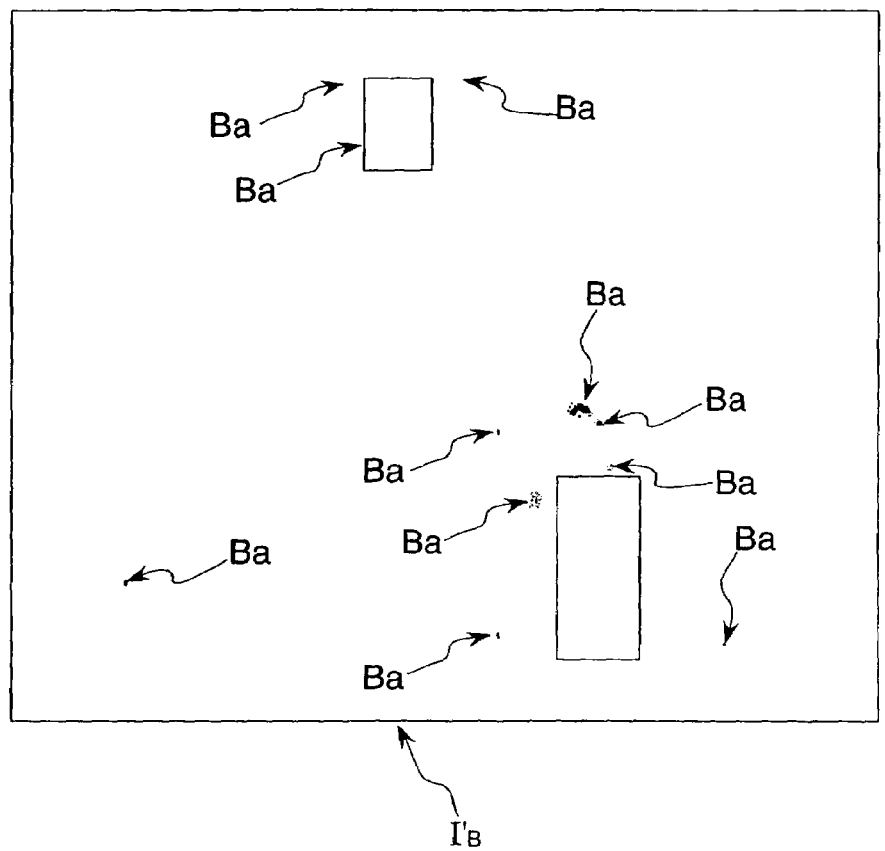
FIG. 7 is an illustration of a ball domain detected according to the embodiment.

More specifically, the detection mode is a mode for detecting all ball prospect positions each having an area smaller than a predetermined template $T_b(x,y)$ in a domain around each player within an image $I'_B$ from which the players' positions P have been erased at the point in time t with use of the template $T_b(x,y)$ provided with a ball size of $b_x \times b_y$, as shown in FIG. 7. Likewise, ball prospects at points in time t=t+1, t+2, . . . are detected and series of ball prospects Ba which are detected to be radially consecutive from about a player's position are chosen and the number of such series of ball prospects Ba is reduced by selection to find a single series of ball prospects Ba. The finally selected series of ball prospects Ba can be specified as a ball trajectory BW in a time segment of concern. The template $T_b(x,y)$ is a kind of tool provided for extracting the ball from the picture information. In this embodiment the size of the ball to be displayed as expanded or compressed is provisionally established as $b_x \times b_y$ and a periphery slightly expanded outwardly from $b_x \times b_y$ is established as the template.

The trace mode is a mode for tracing the ball trajectory BW by template matching with the template $T_b(x,y)$. In this mode, tracing is conducted using as the center of presumption a position obtained by adding an amount of move detected last time directly to a current frame on the assumption that ball trajectory BW in a very short period of time can be considered to be substantially straight. When the distance between a player's domain and the position of a ball prospect Ba becomes smaller than a certain threshold value, the trace mode is switched to the detection mode. If not, the trace mode operation is repeatedly conducted.

Figure 8:
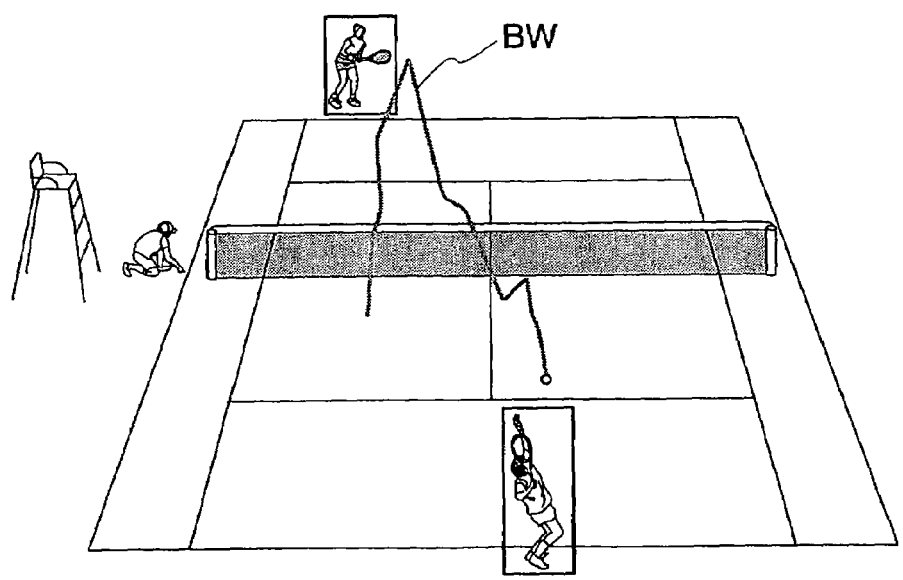
FIG. 8 is an illustration of a trace of a ball position.

In this way, the ball trajectory BW in a desired time segment can be obtained as shown in FIG. 8. Note that the ball trajectory BW is superimposed on picture information obtained at a desired point in time in FIG. 8 for convenience in showing the ball trajectory BW.

The basic movement information storage section 103 is configured to store basic movement information on players' characteristic movements generalized in a sport of concern and is provided in a predetermined area of the external storage device 12 or internal memory 13. In this embodiment the basic movement information includes five attribute values as connected with respective basic movement information IDs identifying unique values in the present system, as shown in FIG. 9. The five attribute values are: "stay" indicative of a staying movement of a player on the spot, "move" indicative of a move of a player, "forehand_swing" indicative of a forehand swing motion, "backhand_swing" indicative of a backhand swing motion, and "overhead_swing" indicative of an overhead swing motion.

The rule information storage section 104 is configured to store rule information required for a sport of concern and movement index rule information on movements of players doing the sport and is provided in a predetermined area of the external storage device 12 or internal memory 13. More specifically, as shown in FIG. 10, the movement index rule information includes, for example, a movement index rule information item indicative of a player's movement index "service" defined by the description that both players do "stay" in respective zones outside the court at the same point in time and then either of the players does "overhead_swing"

in the zone outside the court based on the basic movement information, and a movement index rule information item indicative of a player's movement index "dash to the net" defined by the description that a player hitting the ball is in a zone other than the net court at the time of hitting and then the player is in the net court at the time of next hitting.

The play event information obtaining section 107 comprises the play event information determining section 105 and the play event index information output section 106 and is configured to obtain play event information items as arranged in a time sequence, each of which is indicative of a player's characteristic movement from picture information included in the contents, the picture information containing information on the obstacle and the players, score information displayed on the screen and like information.

More specifically, the play event information determining section 105 is configured to determine play event information item characteristic of each player provided by the picture information based on the domain elements extracted from the picture information by the domain element extracting section 102, the rule information and movement index rule information, and the basic movement information stored in the basic movement information storage section 103.

Figure 11:
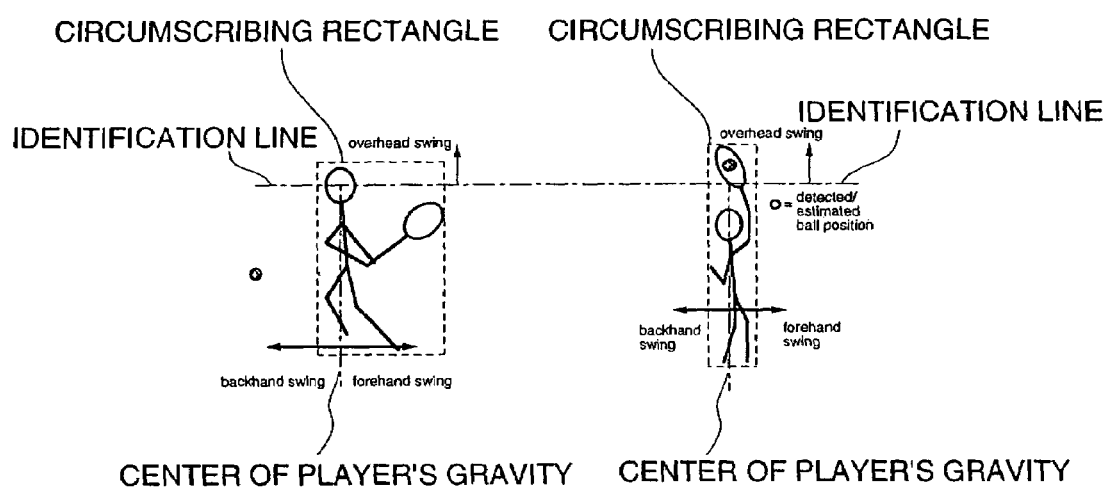
FIG. 11 is an illustration of a manner of identifying player's basic movements according to the embodiment.

Further more specifically, the players' basic movements, such as "forehand_swing", "backhand_swing" and "overhead_swing", are identified by totally judging the positional relativity between each player's position and the ball position and the positional relation between each player's position and each of the court lines and net lines at the time of ball hitting. For example, as shown in FIG. 11, if the ball is above an identification line extending through an upper portion of a rectangle circumscribing a player hitting the ball at the time of hitting, the movement of the player is identified as "overhead_swing", while if the ball is on the foreside or backside with respect to the center of gravity of the player, the movement of the player is identified as "forehand_swing" or "backhand_swing". The identification line is established to extend through an upper portion of a player's domain determined by a fixed proportion to the length of the player's circumscribing rectangle along the y-axis.

The play event index information output section 106 is configured to output to the play event information obtaining section 107 a time chart in which plural play event information items determined by the play event information determining section 105 and ball position information items are arranged in a time sequence.

Figure 12:
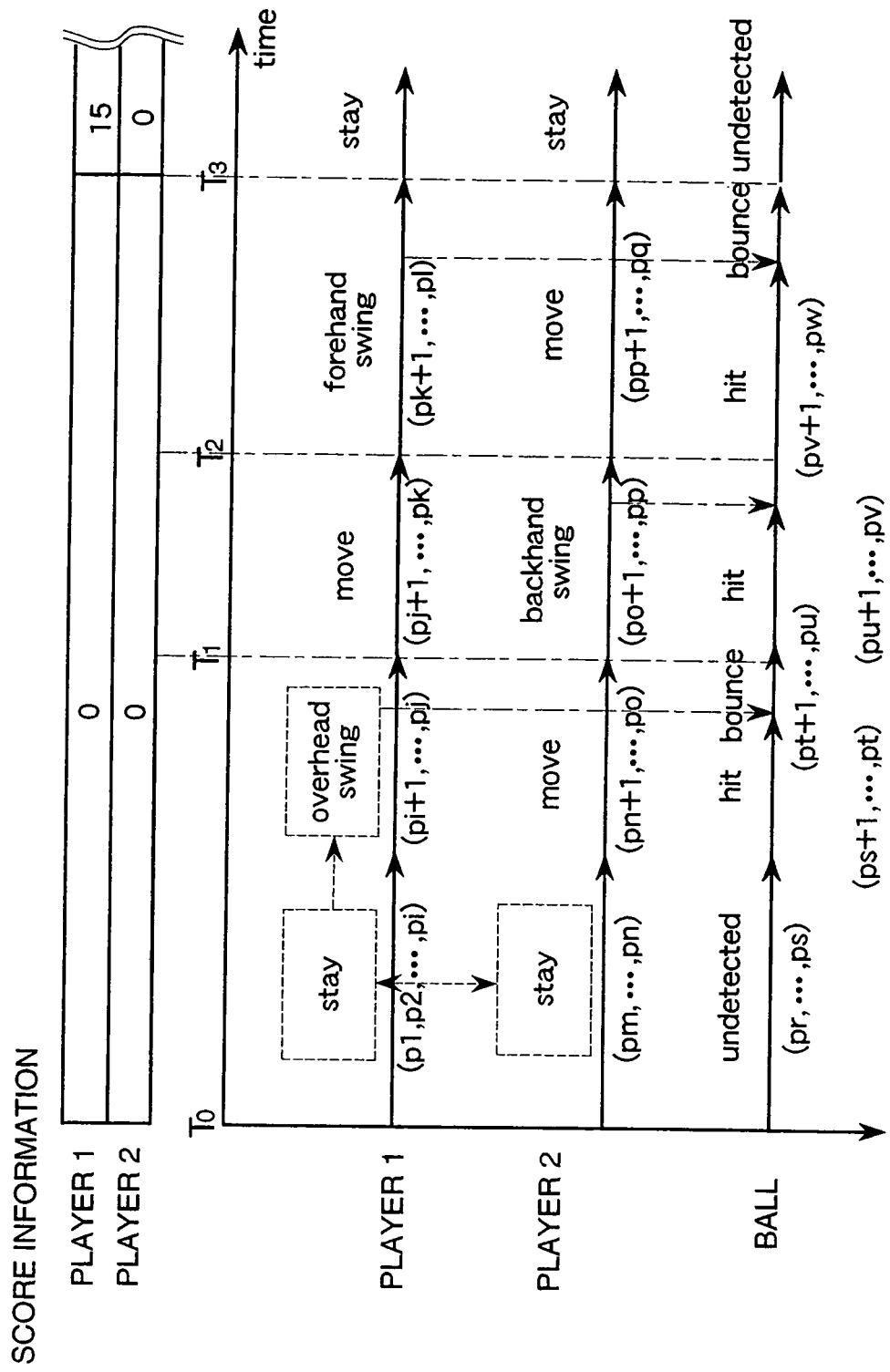
FIG. 12 is a time chart in which a play event information item on each player and a ball position are connected to a score information item according to the embodiment.

More specifically, the time chart describes information items on the relation between the ball and each of players 1 and 2 as arranged in a time sequence, as shown in FIG. 12. For example, the arrow corresponding to "overhead_swing" of the player 1 indicates that during a time segment of concern the player 1 does "overhead_swing" and the ball describes a trajectory BW comprising a j–i number of representative points $(p_{i+1}, \ldots, p_i)$ on the court.

The image substance recognizing section 108 is configured to make a comparison between score information items obtained immediately before and after a point in time of generation of the play event information obtained by the play event information obtaining section 107 and make reference to a result brought by the play event information, thereby recognizing the substance of an image provided the play event information.

More specifically, points in time T1, T2 and T3 immediately following the generation of the play event information will be described with reference to FIG. 12.

First, the player 1 does "overhead_swing" immediately before the point in time T1 and then does "move" immediately after the point in time T1. The player 2, on the other hand, does "move" immediately before the point in time T1 and then does "backhand_swing" immediately after the point in time T1. The ball is "hit" about the point in time T1, then does "bounce" and, thereafter, is "hit" again. Since there is no change in the scores of the respective players 1 and 2 with time passing from immediately before to immediately after the point in time T1, the image substance recognizing section 108 recognizes the play event information item on the play done between the players 1 and 2 immediately before the point in time T1 as not a characteristic movement associated with the scores.

Subsequently, the player 1 does "move" immediately before the point in time T2 and then does "forehand_swing" immediately after the point in time T2. The player 2, on the other hand, does "backhand_swing" and, thereafter, does "move" immediately after the point in time T2. The ball is "hit" about the point in time T2. Since there is no change in the scores of the respective players 1 and 2 with time passing from immediately before to immediately after the point in time T2, the image substance recognizing section 108 recognizes the play event information item on the play done between the players 1 and 2 immediately before the point in time T2 as not a characteristic movement associated with the scores.

Subsequently, the player 1 does "forehand_swing" immediately before the point in time T3 and then does "stay" immediately after the point in time T3. The player 2, on the other hand, does "move" and, thereafter, does "stay" immediately after the point in time T3. The ball is "hit" and then does "bounce" immediately before the point in time T3 and, thereafter, becomes "undetected" immediately after the point in time T3. Since the score of the player 1 changes from 0 to 15 with time passing from immediately before to immediately after the point in time T3, the image substance recognizing section 108 recognizes the fact that the ball "hit" by "forehand_swing" of the player 1 does "bounce" on the court of the player 2 and then is not hit back by the player 2, thus giving a point to the player 1. By reference to the basic movement information storage section 103 and the rule information storage section 104 as to a series of such play event information items, the image substance recognizing section 108 recognizes the series of play event information items as indicating a "successful passing".

Figure 13:
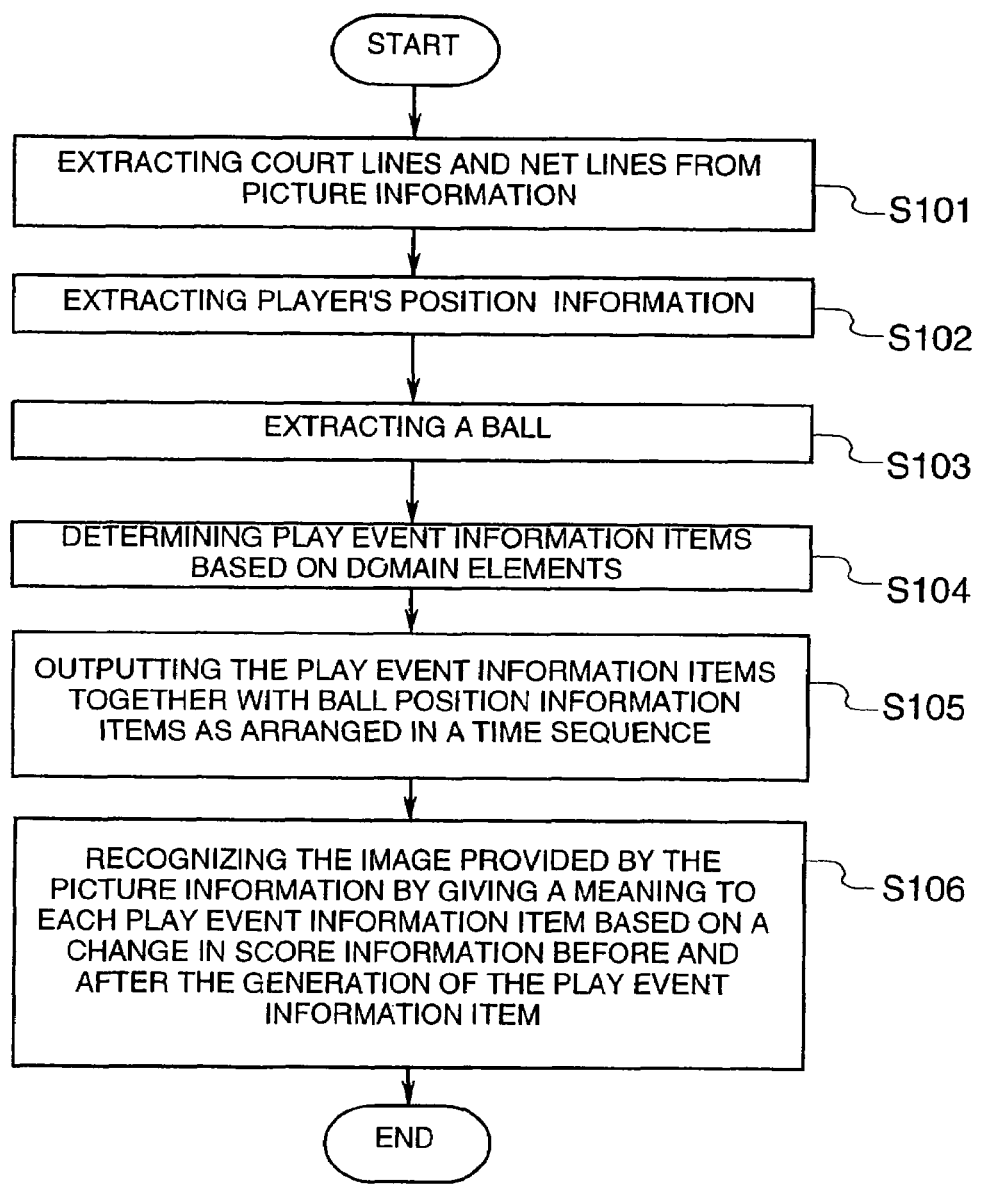
FIG. 13 is a flowchart showing a process of image recognition from picture information according to the embodiment.

Next, the operation of the image recognition apparatus according to this embodiment will be described with reference to the flowchart at FIG. 13.

Initially, court lines and net lines are extracted from picture information (step S101). Player's position information is extracted from the picture information by specifying a domain in which overlapping is maximum in binary images formed by removing the court lines and the net lines from the picture information (step S102). Based on the player's position information thus extracted, a ball is extracted from the picture information (step S103). Play event information items on a player of concern are determined based on the domain elements extracted, the rule information, movement index information and basic movement information (step S104) and then outputted together with ball position information items as arranged in a time sequence (step S105). The image provided by the picture information is recognized by giving a meaning to each play event information item based on a change in score information before and after the generation of the play event information item (step S106).

Since it can be reliably judged which of the players' respective scores relates to a play event information item of concern from score information items obtained immediately before and after the point in time of the generation of the play event information item as described above, a relatively inexpensive image recognition apparatus can be provided which is capable of recognizing a specific substance of an image by exactly grasping the description of the play event information.

In this embodiment, a tennis program is used as an exemplary one of the contents, while facility information as a domain element to be extracted from the picture information on the tennis program includes information on court lines and information on net lines. It is, however, needless to say that if the contents change from the tennis program to another sport program, the facility information to be extracted changes also. Similarly, the player's position information and the instrument information also change.

While this embodiment is configured to arrange play event information items in a time sequence and then obtain score information items before and after the generation of each play event information item, it is possible to obtain score information items before and after the point in time of the generation of each play event information item, for example, without arranging play event information items in a time sequence. Further, the contents of the play event information to be obtained and the process for obtaining the play event information may be embodied variously.

This embodiment is configured to recognize characteristic movements of players playing in a sport match from sports contents including a television program being telecasted on a television receiver TV or being reproduced by a recording/reproducing device such as a VTR, and such contents as recorded in a recording medium. However, media through which contents as a subject for image recognition are provided are not limited to those used in this embodiment. For example, it is possible to recognize characteristic movements of players playing in a sport match or game from image materials which have been just taken from the sport match or game at a stadium and hence are in an uncompleted state for broadcasting or from archived picture information on Internet.

While this embodiment is configured to extract a ball from picture information using the predetermined template $T_b(x,y)$ having a ball size of $B_x \times B_y$, the ball may be extracted without using the template.

The specific features of other sections or parts are not limited to this embodiment but may be modified variously without departing from the concept of the present invention.

INDUSTRIAL APPLICABILITY

According to the present invention having been described above, it can be reliably judged which of players' respective scores relates to a play event information item from score information items obtained immediately before and after the point in time of the generation of the play event information item. Thus, the present invention can provide a relatively inexpensive image recognition apparatus which is capable of recognizing a specific substance of an image by exactly grasping the description of the play event information item.

With such an image recognition apparatus, it is possible to extract a desired portion from a program being telecasted or contents being reproduced by a recording/reproducing device as well as to access archived picture information on Internet or the like for extraction of a desired portion from the picture.

The invention claimed is:

1. An image recognition apparatus for recognizing movements of players matched against each other between domains partitioned with such an obstacle as net in a sport match or game from contents including a television program being telecasted to show the sport match or game, an image material in an uncompleted state for broadcasting and contents recorded in such a recording medium as a VTR, the image recognition apparatus comprising:

a score information obtaining section obtaining score information indicative of scores of the respective players which vary as the sport match or game proceeds;

a play event information obtaining section obtaining and recognizing play event information including characteristic movements of each of the players from picture information included in the contents, the picture information containing images of the obstacle and the players, and the score information displayed on a screen; and an image substance recognizing section making a comparison between a score information item obtained immediately before a point in time of generation of the play event information and a score information item obtained immediately after the point in time and make reference to a result brought by the play event information, thereby recognizing a substance of an image provided by the play event information.

2. The image recognition apparatus according to claim 1, wherein the score information obtaining section obtains the score information from at least one of the picture information included in the contents, sound information including commentary voice of a commentator, and data information transmitted as multiplexed on radio waves during broadcasting.

3. The image recognition apparatus according to claim 1, further comprising: a domain element extracting section extracting from the picture information facility information including information on the obstacle, information on the domains and information on boundary lines between the domains and an area outside the domains, player's position information indicative of a player's position, and instrument information on an instrument moving between the domains to serve as an object of score count in the sport match or game; rule information storage section storing rule information on the sport match or game; and basic movement storage section storing basic movement information on players' characteristic movements generalized in a sport of concern, wherein the play event information obtaining section includes a play event information determining section determining a play event information item on a play event characteristic of each of the players included in the picture information as the play event information based on domain elements extracted from the picture information, the rule information, and the basic movement information stored in the basic movement information storage section.

4. The image recognition apparatus according to claim 3, wherein the player's position information is position information indicative of a domain containing each of the players and the instrument constantly held and used by the player.

5. The image recognition apparatus according to claim 3, wherein the domain element extracting section extracts the player's position information from the picture information based on the facility information extracted by the domain element extracting section.

6. The image recognition apparatus according to claim 3, wherein the domain element extracting section extracts the instrument information from the picture information based on the facility information and the player's position information extracted by the domain element extracting section.

7. The image recognition apparatus according to claim 3, wherein the play event information obtaining section includes a play event index information output section outputting plural play event information items determined by the play event information determining section as arranged in a time sequence.

8. The image recognition apparatus according to claim 7, wherein the play event index information output section outputs the play event information items together with instrument information items in a time sequence.

9. A computer readable medium encoded with an image recognition program such that when executed, the image recognition program causes an image recognition apparatus to operate to recognize movements of players matched against each other between domains partitioned with such an obstacle as net in a sport match or game from contents including a television program being telecasted to show the sport match or game, an image material in an uncompleted state for broadcasting and contents recorded in such a recording medium as a VTR, the image recognition program causing the image recognition apparatus to function as:

a score information obtaining means obtaining score information indicative of scores of the respective players which vary as the sport match or game proceeds;

a play event information obtaining means obtaining and recognizing play event information including characteristic movements of each of the players from picture information included in the contents, the picture information containing images of the obstacle and the players, and the score information displayed on a screen; and an image substance recognizing means making a comparison between a score information item obtained immediately before a point in time of generation of the play event information and a score information item obtained immediately after the point in time and make reference to a result brought by the play event information, thereby recognizing image contents of the play event information.

* * * * *